J. P. EUSTIS.

MEANS FOR MOUNTING MIRRORS, PICTURES, &c., IN METALLIC FRAMES.

APPLICATION FILED OCT. 29, 1908.

Reissued Aug. 2, 1910. 13,140.

Witnesses

Donald Campbell

Elizabeth B. King

Inventor

John P. Eustis

By Geo. L. Wheelock

Attorney

THE NORRIS PETERS CO., WASHINGTON, D. C.

UNITED STATES PATENT OFFICE.

JOHN P. EUSTIS, OF NEWTON, MASSACHUSETTS.

MEANS FOR MOUNTING MIRRORS, PICTURES, &c., IN METALLIC FRAMES.

13,140. Specification of Reissued Letters Patent. Reissued Aug. 2, 1910.

Original No. 753,967, dated March 8, 1904, Serial No. 187,653. Application for reissue filed October 29, 1908. Serial No. 460,164.

*To all whom it may concern:*

Be it known that I, JOHN P. EUSTIS, of Newton, in the county of Middlesex and State of Massachusetts, have invented certain new and useful Improvements in Means for Mounting Mirrors, Pictures, and Like Articles in Metallic Frames, of which the following, taken in connection with the accompanying drawings, is a specification.

My invention relates to means for mounting mirrors, pictures, and like articles in metallic frames; and it consists in certain novel features of construction, arrangement, and combinations of parts which will be readily understood by reference to the description of the accompanying drawings and to the claims hereto appended, and in which my invention is clearly pointed out.

Figure 1:
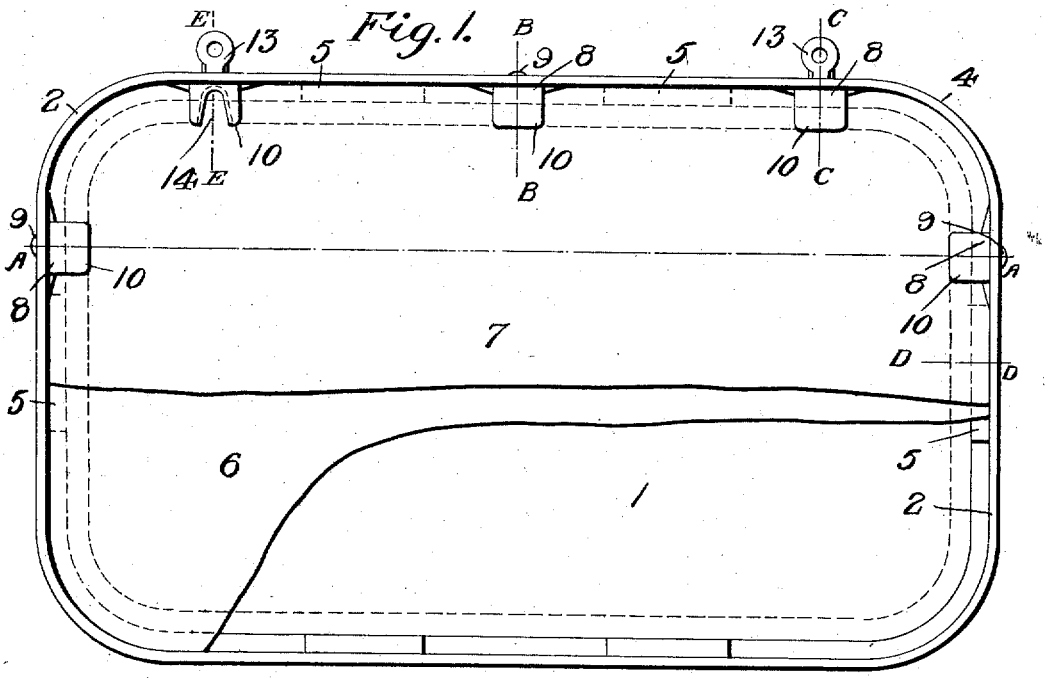
Figure 2:
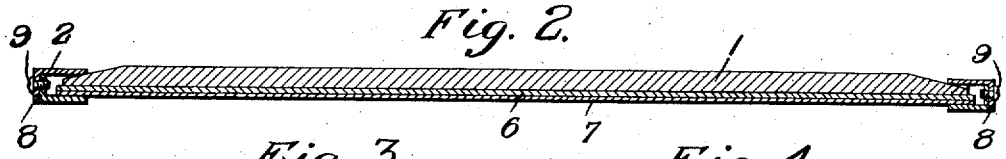
Figure 3:
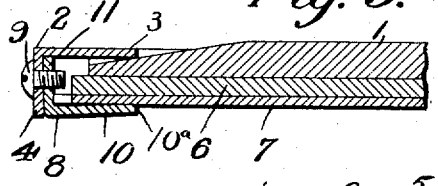
Figure 4:
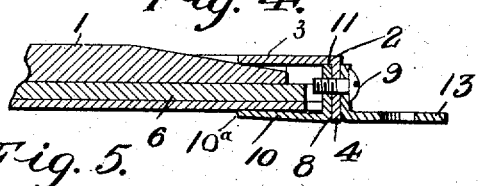
Figure 5:
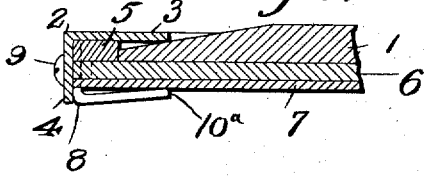
Figure 7:
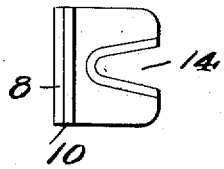
Figure 8:
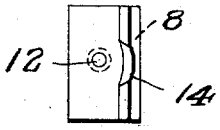
Figure 6:
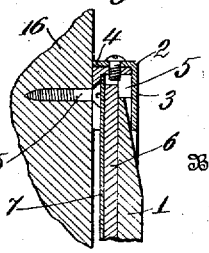

Figure 1 is a rear side elevation of a mirror and frame embodying my invention with portions of the back-board or plate and the amalgam protecting-sheet of fiber board broken away to more clearly illustrate the construction and arrangement of the several parts which make up the assembled whole. Fig. 2 is a longitudinal section on line A—A on Fig. 1. Fig. 3 is a partial section on line B—B on Fig. 1. Fig. 4 is a similar section on line C—C on Fig. 1. Fig. 5 is a section on line D—D on Fig. 1. Fig. 6 is a vertical section of the upper portion of the frame on line E—E on Fig. 1 and showing also in section a portion of a wall to illustrate a blind hanging device for supporting the mirror in position on the wall, the eye-plate being omitted. Fig. 7 represents in plan a modified form of the clamping-clip, and Fig. 8 is an edge view of the same looking at the slotted edge thereof.

In the drawings, 1 is the mirror-plate, which may be of any desired outline, but is shown in the drawings as having parallel sides and ends with rounded corners.

2 is a metal frame comprising a face-flange 3 and an edge-flange 4, said flanges being formed integral and at right angles to each other, as shown in Figs. 3, 4, 5 and 6. The frame 2 is made somewhat larger than the mirror-plate, so that the outer edges of said plate shall not at any point come in contact with the flange 4 of said frame; but the inner surface of the flange 3 rests upon the outer face of the mirror-plate, as shown in Figs. 3, 4 and 5. If the mirror has a beveled edge or if the mirror has no beveled edge, the flange 3 will contact with a larger area of the flat surface of the mirror-plate, as is clearly obvious. Stay-blocks 5, preferably of wood, are inserted at intervals between the flange 4 and the edge of the mirror-plate around its entire perimeter to secure said plate in its appropriate position centrally of said frame and prevent any possibility of said plate being moved laterally out of said central position.

A sheet of fiber board 6 of variable thickness, according to the varying thicknesses of the mirror-plates, and cut to a size and shape to fit the interior contour of the flange 4 is placed in contact with the amalgamated surface of the mirror-plate 1, and a correspondingly-shaped metal backing-plate 7 is placed upon and in contact with said fiber-board sheet, as shown in Figs. 2, 3, 4, 5 and 6, said frame, mirror-plate, fiber board, and backing-plate being firmly secured together by a series of clips 8, constructed and applied as follows: The flange 4 of the frame 2 has drilled through it a series of holes corresponding to the number of clips employed to receive the fastenings or screws 9 for securing said clips in position. The clips 8 are composed of flat plates 10, and the flange 11 arranged relative to the plate 10 at an angle slightly less than a right angle or so that the inner faces of said plate 10 and flange 11 shall be at an angle of about eightly-seven degrees to each other, and the said flange 11 has formed therein a threaded hole 12 to receive the threaded ends of the screws 9, as shown in Figs. 3, 4, 5, and 6. The modified form of clip in Fig. 6 has a rectangular cross section. At each point where a clip 8 is to be secured to the frame 2 the fiber board and the backing-plate are cut away, notched or recessed sufficiently to receive the flanges 11 of the clips 10 and to permit them to contact or nearly so with the face flange 3 of the frame 2, as shown in Fig. 1. When the frame, mirror-plate, fiber sheet, and backing-plate are assembled as described, the clips 8 are placed in position, one opposite each hole in the frame, with its plate 10 resting upon the backing-plate 7, and the fastenings or screws 9 are then inserted through the holes in the flange 4 of the frame 2 and screwed into the threaded holes in the flanges 11 of the clips 10, so as to draw the flanges 11 of said clips into contact or nearly so with the inner face of the flange 4, the result of which is to draw the inner bearing ends 10[a] of the clip-plates 10 into firm contact with the backing-plate 7 and clamp said frame, mirror-plate, fiber sheet, and backing-plate firmly together. Two of the screws 9, set in the edge of the frame that is designed to be uppermost when the mirror is hung on a wall, firmly secures to said frame a pair of eye-plates, 13, to which the two ends of a suspension wire or cord may be attached, or screws may be inserted through said eye-plates and screwed into the wall of the room to hang said framed mirror or picture.

In some cases parties desire a blind hanging device and for that purpose I dispense with the eye-plates 13 and form in the inner edges of two of the clip-plates tapering slots 14, the widest parts of which are at the inner ends of said plates, the edges of said slots being beveled, so as to engage the beveled under side of the head of the wood-screw 15, set in the wall 16 of the room where the mirror or picture is to be hung.

The means of hanging the mirror may be arranged on one of the longer sides of the frame, as shown, or on one of the shorter sides, according as to whether the longer or shorter axis of the frame is to be vertical when hung on the wall.

I claim:—

1. In a framed mirror or like article, the combination of a metal frame comprising face and edge flanges arranged substantially at a right angle to each other; a glass plate of less length and width than the distances between the opposing portions of the edge-flange, placed in contact with the inner surface of the face-flange; a series of stay-blocks inserted between said edge-flange and the edge of said glass plate; a backing-plate of a size and shape to fit the inner contour of said edge-flange and covering the back of said glass plate, and having in its edge a series of notches or recesses; a series of clips each composed of two integral members having their inner surfaces at an angle to each other somewhat less than ninety degrees, said clips being arranged to engage in said notches and in contact with the inner surface of said edge-flange, with one member of each resting on the outer surface of said backing-plate; and a corresponding series of clamping-screws each passing through said edge-flange and screwed into the other member of the appropriate clip, as and for the purposes described.

2. In a framed mirror or other similar article, the combination of a metal frame comprising face and edge flanges integral with and substantially at a right angle to each other; a glass plate of less area than the space inclosed by said edge-flange, arranged centrally within said space with its outer face in contact with the inner face of said face-flange; a series of stay-blocks inserted between said edge-flange and the edge of said glass plate; a glass-protecting sheet, and a backing-plate both cut to a size and shape to fit the space inclosed by said edge-flange, and each having a series of recesses in its edge; a series of clips each comprising two integral members at an angle to each other, less than ninety degrees, arranged to engage in said notches and with one member in contact with the inner surface of said edge-flange and the other member resting on the outer surface of said backing-plate; a corresponding series of clamping-screws each passing through a hole in said edge-flange and screwed into a threaded hole in said clip to clamp said clip to said edge-flange and press its inner end upon the backing-plate; and means for sustaining said framed article.

3. In a mirror or like framed article, the combination of a metal frame comprising face and edge flanges integral with and substantially at a right angle to each other; a glass plate of less area than the space inclosed by said edge-flange arranged centrally within said inclosed space with its outer face in contact with the inner face of said face-flange; a series of stay-blocks inserted between said edge-flange and the edge of said glass plate at intervals around the entire inner perimeter of said edge-flange; a backing-plate fitted within the inner perimeter of said edge-flange, and having a series of notches or recesses cut in its edge at intervals around its entire perimeter; a suitable glass-protecting packing between said glass and the backing-plate; a series of clips each having two integral members at an angle to each other of less than ninety degrees, arranged to engage in said notches and in contact with the inner side of said edge-flange and with the other member resting upon said backing-plate, a plurality of said clips having, formed, in the member thereof which rests upon said backing-plate, a V-shaped slot the edges of which are beveled; and a corresponding series of screws inserted through holes in said edge-flange and screwed into the members of said clips which are contiguous to the inner surface of said edge-flange, as and for the purposes set forth.

Signed at the city of Boston, county of Suffolk, and State of Massachusetts, this ninth day of October, 1908.

JOHN P. EUSTIS.

Witnesses:

EDWARD W. CASEY,
THOMAS M. KEEFE.